(12) United States Patent
Kondo et al.

(10) Patent No.: US 7,555,766 B2
(45) Date of Patent: Jun. 30, 2009

(54) AUDIENCE RESPONSE DETERMINATION

(75) Inventors: Tetsujiro Kondo, Tokyo (JP); Yuji Okumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 09/966,704

(22) Filed: Sep. 28, 2001

(65) Prior Publication Data
US 2002/0073417 A1    Jun. 13, 2002

(30) Foreign Application Priority Data
Sep. 29, 2000    (JP)    ............... 2000-302862

(51) Int. Cl.
*H04H 60/56* (2008.01)
*H04N 7/18* (2006.01)
*G06K 9/00* (2006.01)
*G06K 9/34* (2006.01)
*G06K 9/40* (2006.01)

(52) U.S. Cl. ............... 725/12; 348/64; 382/162; 382/168; 382/173; 382/181; 382/254

(58) Field of Classification Search ............... 725/9–21; 340/666, 667; 52/6, 136; 345/418, 156; 715/703, 704, 7; 200/85; 74/512
See application file for complete search history.

(56) References Cited

U.S. PATENT DOCUMENTS

| | | | | | |
|---|---|---|---|---|---|
| 2,593,204 | A | * | 4/1952 | Schwartzberg | ............... 381/57 |
| 3,600,516 | A | * | 8/1971 | King, Jr. | ............... 704/207 |
| 4,424,511 | A | * | 1/1984 | Alberts, Jr. | ............... 73/646 |
| 4,483,681 | A | * | 11/1984 | Weinblatt | ............... 434/236 |
| 5,255,326 | A | * | 10/1993 | Stevenson | ............... 381/110 |
| 5,310,962 | A | * | 5/1994 | Kimpara et al. | ............... 84/600 |
| 5,726,701 | A | * | 3/1998 | Needham | ............... 725/105 |
| 5,771,307 | A | * | 6/1998 | Lu et al. | ............... 382/116 |
| 6,353,764 | B1 | * | 3/2002 | Imagawa et al. | ............... 700/1 |
| 6,409,599 | B1 | * | 6/2002 | Sprout et al. | ............... 463/31 |
| 6,507,353 | B1 | * | 1/2003 | Huard et al. | ............... 715/863 |
| 6,600,477 | B1 | * | 7/2003 | Howell | ............... 345/157 |
| 6,665,985 | B1 | * | 12/2003 | Hennes | ............... 52/7 |
| 6,873,710 | B1 | * | 3/2005 | Cohen-Solal et al. | ............... 382/100 |
| 6,956,576 | B1 | * | 10/2005 | Deering et al. | ............... 345/475 |
| 7,050,971 | B1 | * | 5/2006 | Kaufholz | ............... 704/226 |

* cited by examiner

*Primary Examiner*—Dominic D Saltarelli
(74) *Attorney, Agent, or Firm*—Frommer Lawrence & Haug LLP; William S. Frommer

(57) ABSTRACT

An audience response determination apparatus detects the state of an audience and the individual states of the members of the audience to determine the response of the audience to the content of entertainment and the like. Based on the thus determined audience response, a playback operation of the content such as a movie is controlled, so that the level of satisfaction felt by the audience to the content can be increased.

22 Claims, 17 Drawing Sheets

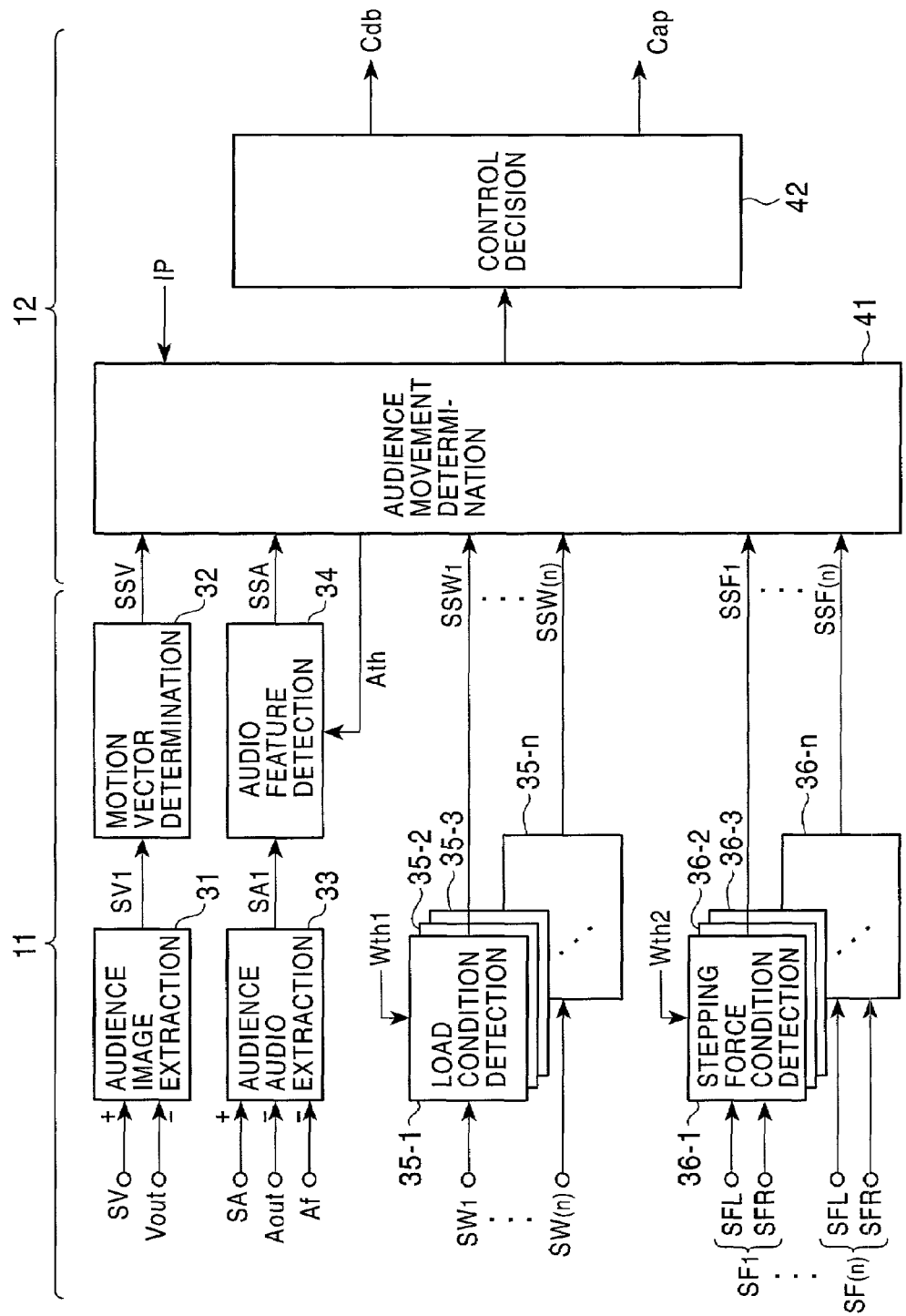

FIG. 8

| | IMAGE DETERMINATION SIGNAL SSV | ESTIMATED STATE |
|---|---|---|
| Va | STATIONARY | INTENTLY WATCHING AND/OR LISTENING |
| Vb | ORDERLY MOVEMENT | CLAPPING HANDS OR EXHIBITING SOME OTHER ACTION TO THE BEAT OF THE MUSIC, PICTURE OR PERFORMANCE; DEMANDING AN ENCORE, ETC. |
| Vc | RANDOM MOVEMENT | APPLAUSE, STANDING OVATION, ETC. |

FIG. 10A
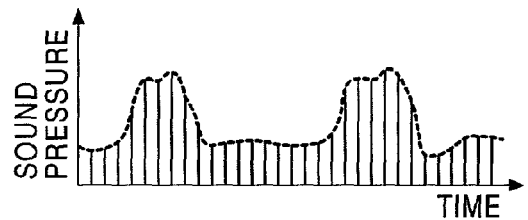
FIG. 10B
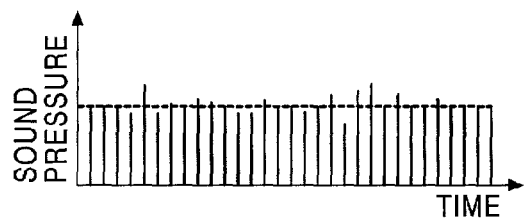
FIG. 11
| | AUDIO DETERMINATION SIGNAL SSA | ESTIMATED STATE |
|---|---|---|
| Aa | SILENCE | INTENTLY WATCHING AND/OR LISTENING |
| Ab | ORDERLY VOICES | SINGING ALONG WITH THE SONG, RESPONDING TO OR CHEERING THE PERFORMANCE IN UNISON |
| Ac | RANDOM VOICES | CHEERING |
| Ad | ORDERLY HAND CLAPPING | CLAPPING HANDS TO THE BEAT OF THE MUSIC, ETC.; DEMANDING AN ENCORE, ETC. |
| Ae | RANDOM HAND CLAPPING | CLAPPING HANDS |

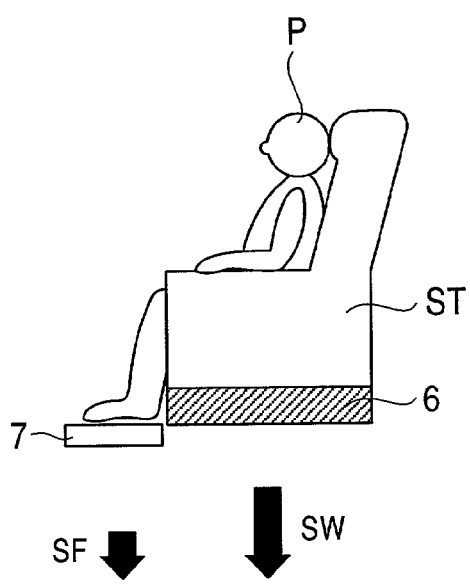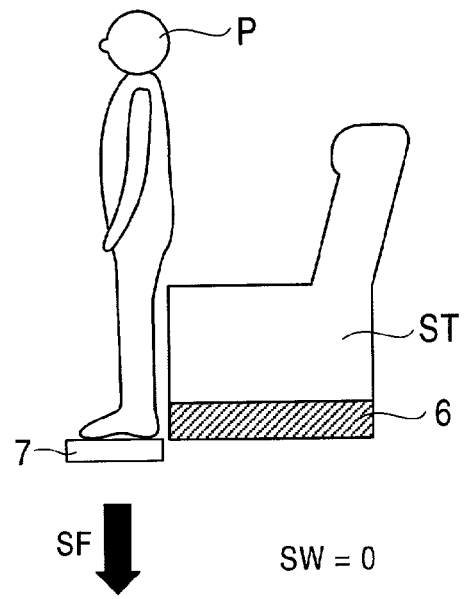

FIG. 14

| | LOAD DETERMINATION SIGNAL SSW | ESTIMATED STATE |
|---|---|---|
| Wa | LOAD PRESENT | SEATED |
| Wb | LOAD ABSENT | STANDING OR ABSENT |

FIG. 15

| | STEPPING FORCE DETERMINATION SIGNAL SSF | ESTIMATED STATE |
|---|---|---|
| Fa | LOAD ABSENT OR SMALL | SEATED OR ABSENT |
| Fd | LOAD LARGE/ NO MOVEMENT | STANDING |
| Fc | LOAD LARGE/ ORDERLY MOVEMENT | STANDING AND MOVING ORDERLY |
| Fd | LOAD LARGE/ RANDOM MOVEMENT | STANDING AND MOVING RANDOMLY |

FIG. 17

| | EXAMPLES OF ESTIMATION RESULT | EXAMPLES OF CONTROL/ PROCESSING CONTENTS |
|---|---|---|
| J1 | INTENTLY WATCHING AND/OR LISTENING | NORMAL PRESENTATION |
| J2 | CLAPPING HANDS OR SINGEING TO THE BEAT OF THE MUSIC | CHANGE THE AUDIO LEVEL OF THE PRESENTATION (FOR EASIER LISTENING); DISPLAY THE LYRICS |
| J3 | CLAPPING HANDS OR SHOUTING REGULARLY | CHANGE THE AUDIO LEVEL OF THE PRESENTATION (FOR EASIER LISTENING); ADD OR CHANGE THE PRESENTATION CONTENT (ENCORE) |
| J4 | CLAPPING HANDS OR CHEERING RANDOMLY | CHANGE THE AUDIO LEVEL OF THE PRESENTATION (FOR EASIER LISTENING); CLASSIFY AS A PARTICULARLY EXCITING SCENE AND PRESENT REPEATEDLY |
| J5 | STANDING | CLASSIFY AS A PARTICULARLY EXCITING SCENE AND PRESENT REPEATEDLY; CHANGE THE POSITION OR METHOD OF PRESENTATION OF THE IMAGE (FOR EASIER VIEWING); MAKE AN ANNOUNCEMENT TO TELL THE AUDIENCE TO BE SEATED |

FIG. 18

| DETERMINATION SIGNAL / ESTIMATION RESULT | IMAGE DETERMINATION SSV | AUDIO DETERMINATION SIGNAL SSA | LOAD DETERMINATION SIGNAL SSW | STEPPING FORCE DETERMINATION SIGNAL SSF | AUXILIARY INFORMATION IP |
|---|---|---|---|---|---|
| J1 | Va | Aa | Wa | Fa | — |
| J2 | Vb | Ab, Ad | Wa | Fa | SONG OUTPUT PRESENT |
| J3 | Vb | Ab, Ad | Wa | Fa | SONG OUTPUT ABSENT |
| J4 | Vc | Ac, Ae | Wa | Fa | — |
| J5 | Va — Vc | Aa — Ae | Wb | Fb — Fd | — |

AUDIENCE RESPONSE DETERMINATION

BACKGROUND OF THE INVENTION

1. Field of the Invention

The present invention relates to an audience response determination apparatus, a playback output control system, an audience response determination method and a playback output control method suitable for use in entertainment facilities where a large audience gathers for watching movies, concerts, plays, shows, sports events and various other events. The invention also relates to a recording medium suitable for realizing these apparatus and methods.

2. Description of the Related Art

A wide variety of entertainment is currently available, including movies, concerts, plays, shows, sports events and other events, where a large audience gathers. In response, techniques and equipment for increasing the level of satisfaction felt by the audience to the entertainment content have been called for and proposed.

It is generally the case that in movie theaters, concert halls and other places (hereafter collectively referred to as a hall) where an audience gathers for watching and/or listening to movies or various types of performance, the audience are expected to simply be there to passively watch or listen to the content being performed or shown.

When the audience in the hall is large enough, they often display a greater response to the show or performance than in the case of watching or listening to similar content at home. This is due to what is known as mob psychology or a sense of being involved in the entertainment (the story, performers, players, etc.). Such responses include clapping of hands, cries, shouts, standing ovations, cheers, chorus, and gestures.

In response to those reactions shown by the audience, it is commonplace for the group of performers playing live music, for example, to voluntarily change the performance schedule or play encores so as to fuel the audience's excitement. However, in the case of movies or when the entertainment content cannot be easily changed, it has been difficult to pick up the audience's response and respond accordingly. It has also been difficult to adjust stage effects in response to the audience's reaction.

It is even more difficult to accurately pick up and judge the audience's overall response, given the fact that the audience comprise various types of people, some with loud voices and action, some without, some may be interested at the moment while some may be not, for example.

SUMMARY OF THE INVENTION

Accordingly, it is an object of the present invention to provide methods and means whereby the audience response in a hall can be accurately determined, and the audience's enjoyment can be increased by controlling various elements of the entertainment content in accordance with the audience response thus determined.

An audience response determination apparatus according to the present invention comprises overall state detection means for detecting an overall state of an audience, individual state detection means for detecting individual states of the members of the audience, and determination means for determining an audience response on the basis of the information detected by the overall state detection means and by the individual state detection means.

Thus, the audience response determination apparatus determines the response of an audience in a hall to the entertainment being provided, such as a movie or a performance. The audience response thus determined is made available in one form or another.

A playback output control system according to the present invention comprises overall state detection means for detecting an overall state of an audience, individual state detection means for detecting individual states of the members of the audience, determination means for determining an audience response on the basis of the information detected by the overall state detection means and by the individual state detection means, playback means for playing back data to be viewed and/or listened to by the audience, and control means for controlling the operation of the playback means on the basis of the audience response determined in the determination means.

Thus, the playback output control system first determines the response of an audience in a hall to the object of entertainment such as a movie, and then controls the playback of the movie and the like based on the thus determined audience response.

The control means may preferably control the selection of data to be played back by the playback means, i.e., the playback content per se, on the basis of the audience response determined in the determination means.

The control means may further preferably control the signal processing on the data played back by the playback means, i.e., the visual or audio effects provided on the playback content, for example, on the basis of the audience response determined in the determination means.

In the audience response determination apparatus or in the playback output control system, the overall state detection means may preferably take an image of the entire audience, and detect the overall bodily state of the audience on the basis of the image thus taken.

The overall state determination means may further preferably collect sounds generated by the audience and detect the overall state of the audience based on the collected sounds.

The individual state detection means may preferably detect a load applied to each of the seats by each member of the audience.

The individual state detection means may further preferably detect a stepping force provided by each member of the audience.

An audience response determination method according to the present invention comprises the steps of detecting an overall state of an audience, detecting individual states of the members of the audience, and determining an audience response on the basis of the information detected by the steps of detecting the overall state of the audience and detecting the individual states of the members of the audience.

A recording medium according to the present invention records a processing program for carrying out a processing corresponding to the aforementioned method.

A playback output control method according to the present invention comprises the steps of detecting an overall state of an audience, detecting individual states of the members of the audience, determining an audience response on the basis of the information detected by the steps of detecting the overall state of the audience and detecting the individual states of the members of the audience, and controlling the playback operation of data to be watched or listened to by the audience on the basis of the audience response determined in the determination step.

A recording medium according to the present invention records a processing program for carrying out a processing corresponding to the aforementioned method.

BRIEF DESCRIPTION OF THE DRAWINGS

FIGS. 4 is a block diagram of a detection signal processing unit and a determination processing unit of the embodiment;

FIG. 8 is a table for the explanation of image determination signals in the embodiment;

FIGS. 10A and 10B shows waveforms for the explanation of an audio feature detection operation in the embodiment;

FIG. 11 is a table for the explanation of audio determination signals in the embodiment;

FIGS. 12A and 12B are drawings for the explanation of different states of a load applied to a load sensor and a stepping force sensor in the embodiment;

FIG. 14 is a table for the explanation of load determination signals in the embodiment;

FIG. 15 is a table for the explanation of stepping force determination signals in the embodiment;

FIG. 17 is a table for the explanation of examples of estimated audience response in the embodiment;

FIG. 18 is a table for the explanation of estimation processing in the embodiment.

DESCRIPTION OF THE PREFERRED EMBODIMENT

Figure 1:
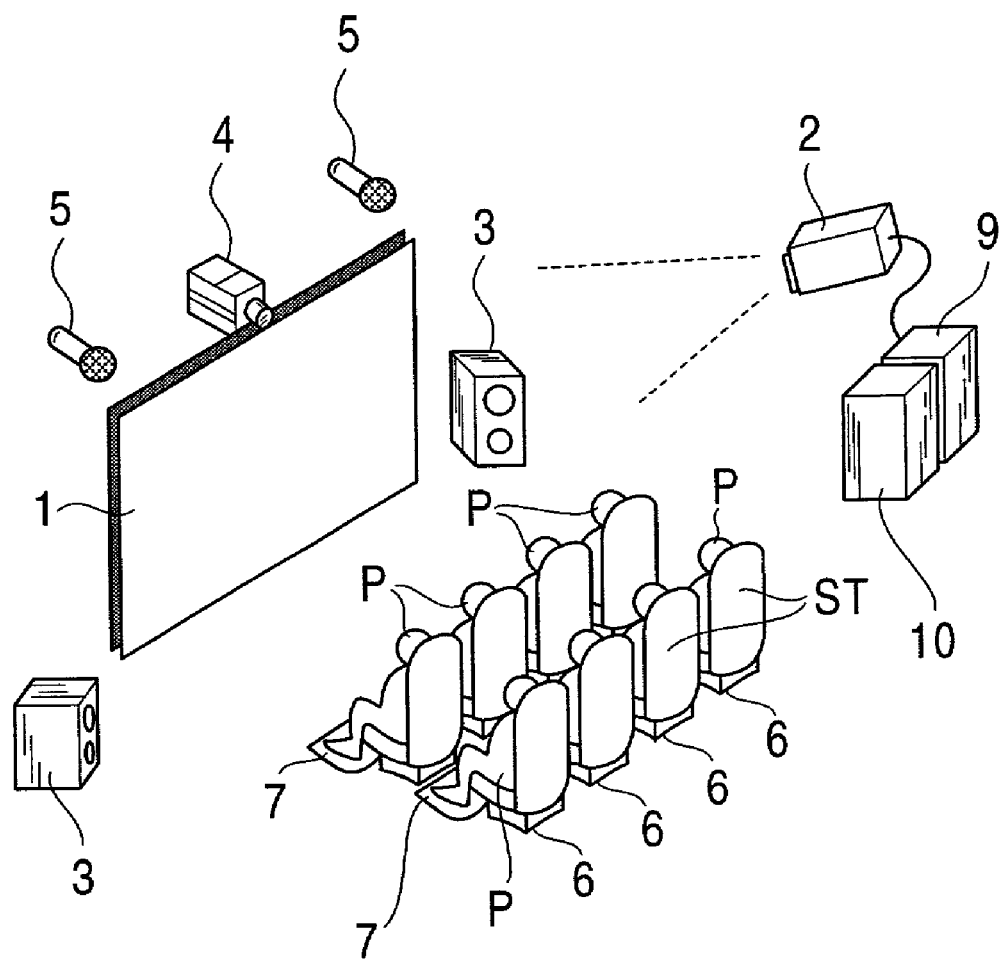
FIG. 1 schematically shows an embodiment of a system according to the present invention.

The present invention will be hereafter described by way of a preferred embodiment in a movie theater setting, in which a movie is converted into video data, stored and then played back for presentation by a video projector. The description will proceed in the following order:

1. System structure

2. Generation of determination signals in a detection signal processing unit

3. Determination/control processing in a determination processing unit

4. Various modifications

5. Software solution for the implementation of the embodiment

1. System structure

FIG. 1 schematically shows the structure of a system embodying the present invention. This system is set up in a movie theater setting where the video data of a movie is presented by the video projector. Therefore, the system comprises a screen 1 on which the movie picture is projected, and a projector 2 for projecting the picture onto the screen 1, as shown.

The video data supplied to the projector 2 is stored in a server 9. The server 9 plays back the video data as required under the control of a detection/control unit 10 and supplies the playback data to the projector 2.

Speakers 3 for outputting the audio portion of the movie are located on the left and right of the screen 1. Audio data is played back by the server 9 together with the video data, and supplied via a power amplifier unit (not shown) to the audio output speakers 3.

A number of seats ST for an audience P are arranged facing the screen 1. The members of the audience P are normally seated in the seats ST when watching the movie projected on the screen 1.

A video camera 4 is located at the side of the screen 1, for example, to capture images of the entire audience P. Thus, the video camera 4 can capture image data concerning the appearance of the audience P during the presentation of the movie.

In order to collect sounds in the hall, microphones 5 are mounted in the general direction of the audience P.

Each of the seats ST has a load sensor 6, so that it can be determined whether the seat is occupied or not on the basis of the presence or absence of a load.

Further, a stepping force sensor 7 is mounted in front and below each of the seats ST, such that the feet of each spectator are on the stepping force sensor when the spectator is seated in the seat ST and when he is standing. Thus, the load applied by the feet of each spectator can be detected.

Figure 2:
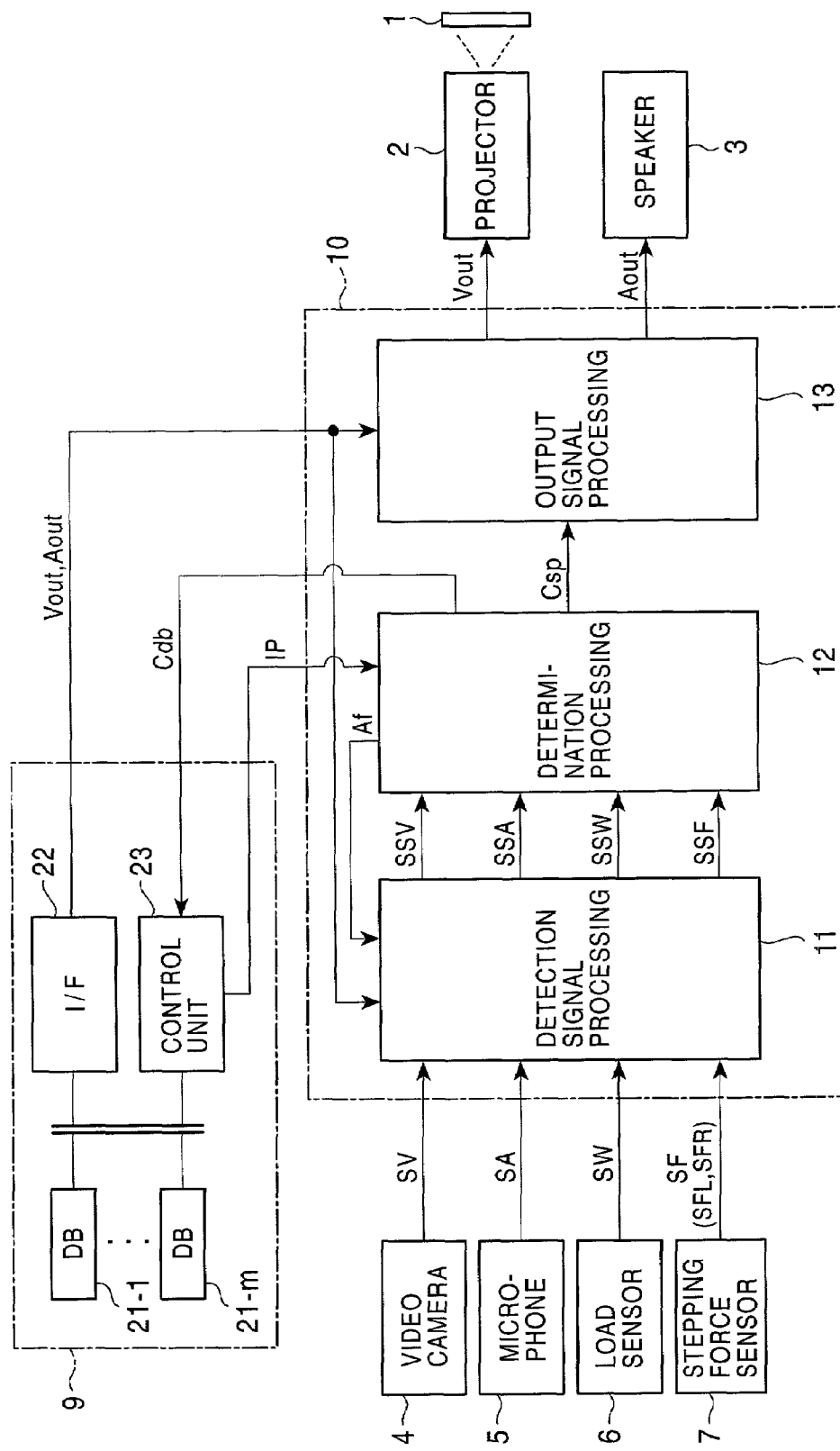
FIG. 2 is a block diagram of the embodiment.

FIG. 2 shows a block diagram of the individual components of the system shown in FIG. 1.

The detection/control unit 10 comprises a detection signal processing unit 11, a determination processing unit 12, and an output signal processing unit 13.

The detection signal processing unit 11 receives and processes signals from various sensors detecting the state of the audience P and the atmosphere within the hall. Specifically, the detection signal processing unit 11 receives an image signal SV from the video camera 4. The video camera 4 functions as an image sensor capturing the overall appearance of the audience. The detection signal processing unit 11 also receives an audio signal SA from the microphones 5 as an audio sensor detecting the sounds in the hall. The detection signal processing unit 11 further receives a load detection signal SW from the load sensor 6 assigned to each seat ST. Further, the detection signal processing unit 11 receives a stepping force detection signal SF from the stepping force sensor 7 mounted below each seat ST.

Since, as will also be described later, the load sensor 6 is assigned to each seat, there are as many load sensors 6 as the number n of the seats ST. Accordingly, the load detection signal SW that is actually supplied to the detection signal processing unit 11 includes load detection signals SW1-SW(n) from the respective load sensors 6.

Likewise, since there are as many stepping force sensors 7 as the number of the seats, the stepping force detection signal SF that is actually supplied to the detection signal processing unit 11 includes stepping force detection signals SF1-SF(n) from the respective stepping force sensors 7. Each stepping force sensor 7 comprises a left detection portion 7L and a right detection portion 7R, which are generally responsible for the left and right feet, respectively. As a result, the stepping force detection signal can be output independently for the left and right feet, as will be described later with reference to FIG. 13. Thus, each of the stepping force detection signals SF1-SF(n) comprises a left stepping force detection signal SFL from the left detection portion 7L and a right stepping force detection signal SFR from the right detection portion 7R.

The detection signal processing unit 11 processes the image signal SV, audio signal SA, load detection signal SW, and stepping force detection signal SF as required in each case and generates determination signals indicating the overall and individual states of the audience, as will be described in detail later.

More specifically, the detection signal processing unit 11 generates an image determination signal SSV based on the image signal SV, an audio determination signal SSA based on the audio signal SA, a load determination signal SSW based on the load detection signal SW, and a stepping force determination signal SSF based on the stepping force detection signal SF. These determination signals are supplied to the determination processing unit 12.

The determination processing unit 12 determines the response of the audience to the movie on the basis of the image determination signal SSV, audio determination signal SSA, load determination signal SSW, and stepping force determination signal SSF. The audience responses include the audience watching or listening intently, clapping their hands, etc.

The determination processing unit 12 then outputs a control signal Cdb to the server 9 or another control signal Csp to the output signal processing unit 13 on the basis of the result of determination, i.e., the audience response.

The server 9 comprises a plurality of databases 21 (21-1 to 21-m) storing the video and audio data as the content of the movie. The server 9 also comprises a control unit 23 for controlling the writing and playback of data into and from the databases 21 (21-1 to 21-m), and an interface unit 22 for the input/output of recording data and playback data.

The control unit 23 controls the playback of required data from and writing of new data into the databases 21 in accordance with operations performed in an operation unit (not shown), such as an operation device operated by an operator employed by the theater. Also, the control unit 23 controls the playback and the like of data from the databases 21 on the basis of the control signal Cdb supplied from the determination processing unit 12.

During the playback of data about the movie content, the control unit 23 supplies information indicating the current playback content to the determination processing unit 12 as auxiliary information IP. The auxiliary information IP is used in the determination processing unit 12 for determining the audience response, as will be described later.

The specific content of the auxiliary information IP may vary. For example, it may be, for the purposes of indicating the current state of the movie, indications about whether or not the movie is being shown, whether or not the movie proper (as distinguished from the commercials and trailers) is being shown, the type of the scene being shown, and whether or not music is being played.

Under the control of the control unit 23, video data Vout and audio data Aout are read from the databases 21 and output via the interface unit 22. The video and audio data Vout and Aout are processed as video and audio signals in the output signal processing unit 13 as required, and the processed signals are supplied to the projector 2 and the speakers 3.

Figure 3:
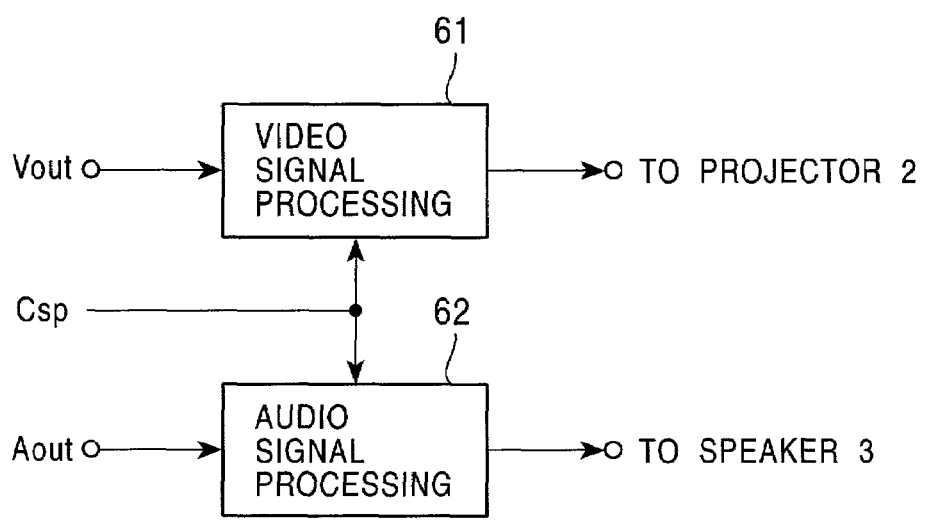
FIG. 3 is a block diagram of an output signal processing unit of the embodiment.

As shown in FIG. 3, the output signal processing unit 13 comprises a video signal processing unit 61 for the video data Vout, and an audio signal processing unit 62 for the audio data Aout. The video signal processing unit 61 and audio signal processing unit 62 process the signals in accordance with instructions given by the operator through the operating unit (not shown) and/or in accordance with the control signal Csp from the determination processing unit 12.

For example, the video signal processing unit 61 can process the video data Vout in order to produce such special image effects as image size alteration, alteration of the location of the image presented, superposition of a character image or a text image, zooming, mosaic, and other image effects.

The audio signal processing unit 62 can process the audio data Aout to change the volume level, provide sound effects such as echo and reverb, change the location of the output sound image, pan the output sound, superpose other sounds such as an announcement, or various other sound effects.

2. Generation of determination signals in the detection signal processing unit

FIG. 4 shows the structure of the detection signal processing unit 11 and the determination processing unit 12 in the detection/control unit 10. The individual blocks shown may be built by either hardware or software.

First, the generation of the individual determination signals SSV, SSA, SSW and SSF, as well as the structure of the detection signal processing unit 11, will be described.

The detection signal processing unit 11 comprises, as processing blocks for the image signal SV, an audience image extraction unit 31 and a motion vector determination unit 32.

The audience image extraction unit 31 extracts from the image signal SV any noise components introduced during the detection process, and outputs an image signal SV1 as information about the actual actions or state of the audience.

The image of all seats ST captured by the video camera 4 shows effects of the picture (light) on the screen 1 being reflected on the seats ST. Such effects in the image signal SV caused by that reflection do not correspond with the actions or state of the audience. Accordingly, the audience image extraction unit 31 receives the video data Vout played back by the server 9, determines the luminance level of the video data Vout, for example, and then cancels out the components corresponding to the luminance level from the image signal SV, thereby producing the image signal SV1.

The image signal SV1 in which the reflection components have been thus canceled is input to the motion vector determination unit 32, where vectors (magnitudes and directions) of movements (changes) in the image are determined. Based on the state of the motion vectors, the motion vector determination unit 32 generates the image determination signal SSV, which is used for estimating the audience response, and outputs the signal SSV to the determination processing unit 12.

Figure 5A:
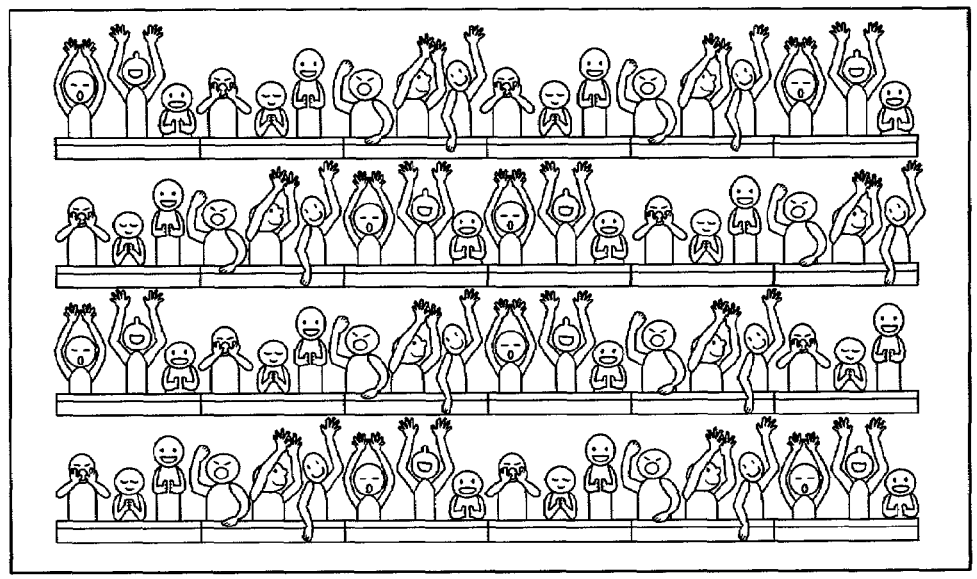
FIGS. 5A and 5B are illustrations for the explanation of an image detection process in the embodiment.
Figure 6A:
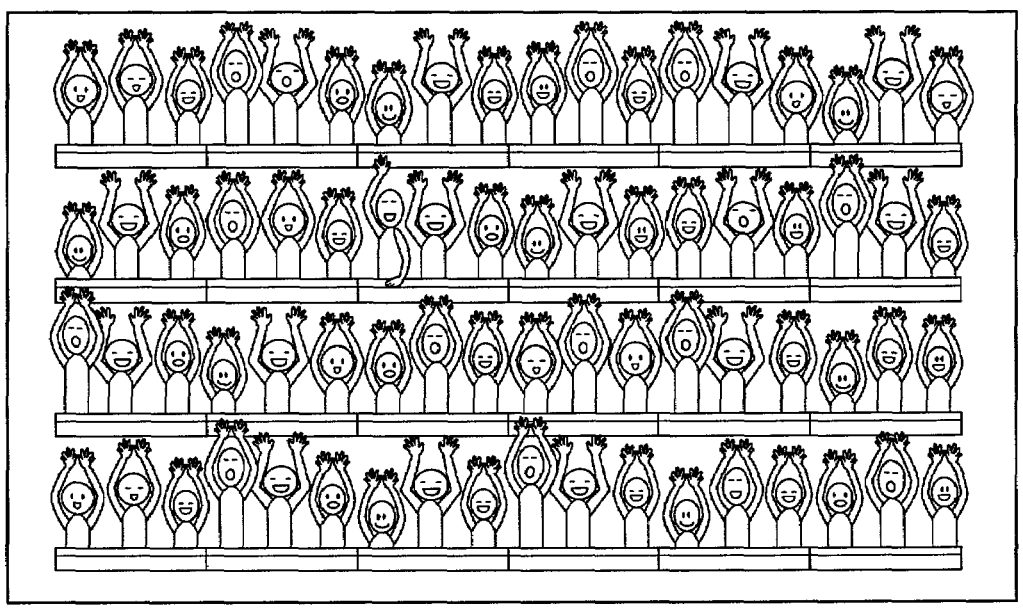
FIGS. 6A and 6B are other illustrations for the explanation of the image detection process in the embodiment.
Figure 7A:
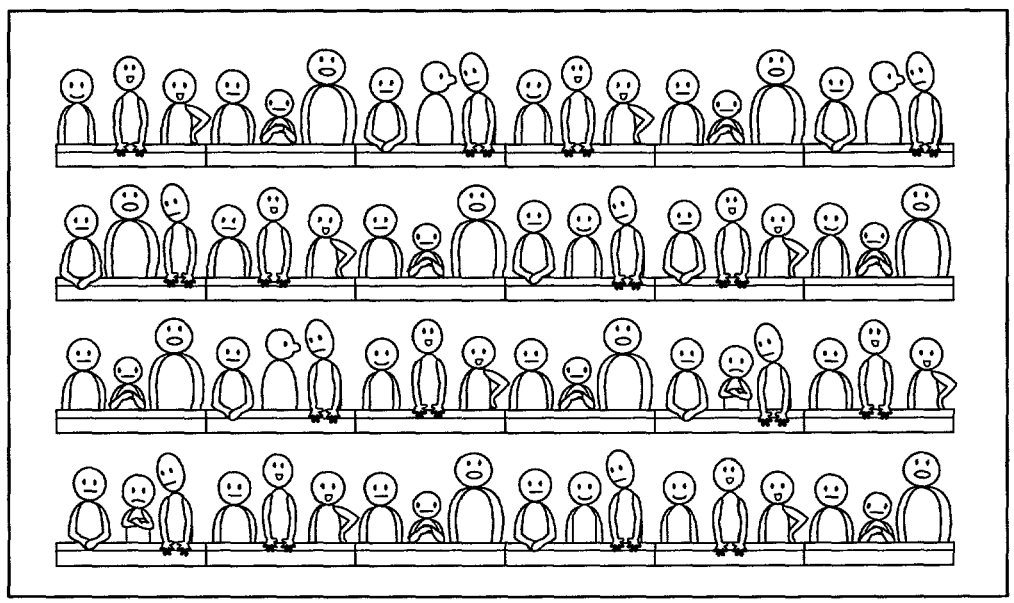
FIGS. 7A and 7B are other illustrations for the explanation of the image detection process in the embodiment.

FIGS. 5A, 6A, and 7A show examples of the image of the audience taken by the video camera 4.

Figure 5B:
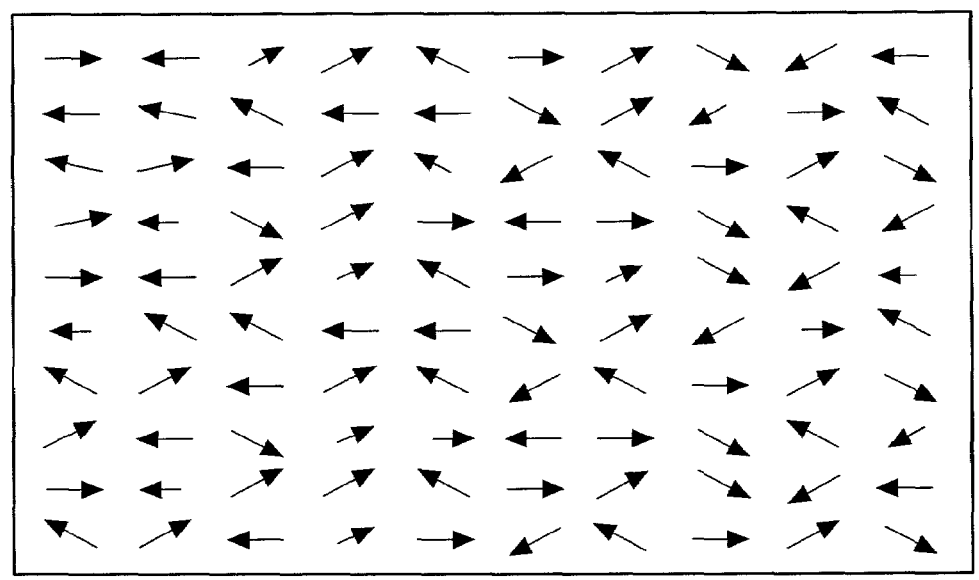

FIG. 5A shows the people in the audience clapping their hands or cheering. By comparing the individual frames of the image signal SV1, for example, during the interval of time in which this video footage was taken, motion vectors can be detected. The motion vectors show random movements as shown in FIG. 5B, for example. These motion vectors, when the people in the audience are clapping their hands, are characterized in that the magnitude of each movement relatively small and that the vectors are locally stagnant. Other characteristics are that the vectors are generally random in both direction and magnitude, and that the magnitude of motion of the vectors at the macroscopic level, i.e., the sum movement of the entire audience, is nearly zero.

Figure 6B:
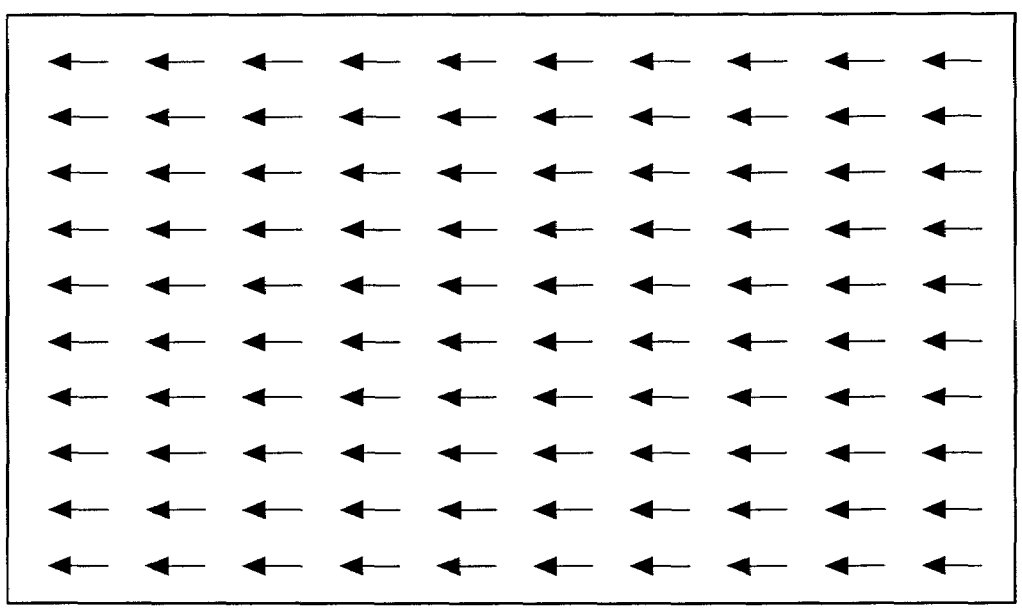

FIG. 6A shows the people in the audience waving or clapping their hands to the beat of the music being played, or raising their hands in step with the picture or sound the audience is watching or hearing. In this case, the motion vectors are generally orderly, as shown in FIG. 6B. There is also a similarity among the individual motion vectors, and the macroscopic movement of the audience has certain features.

Figure 7B:
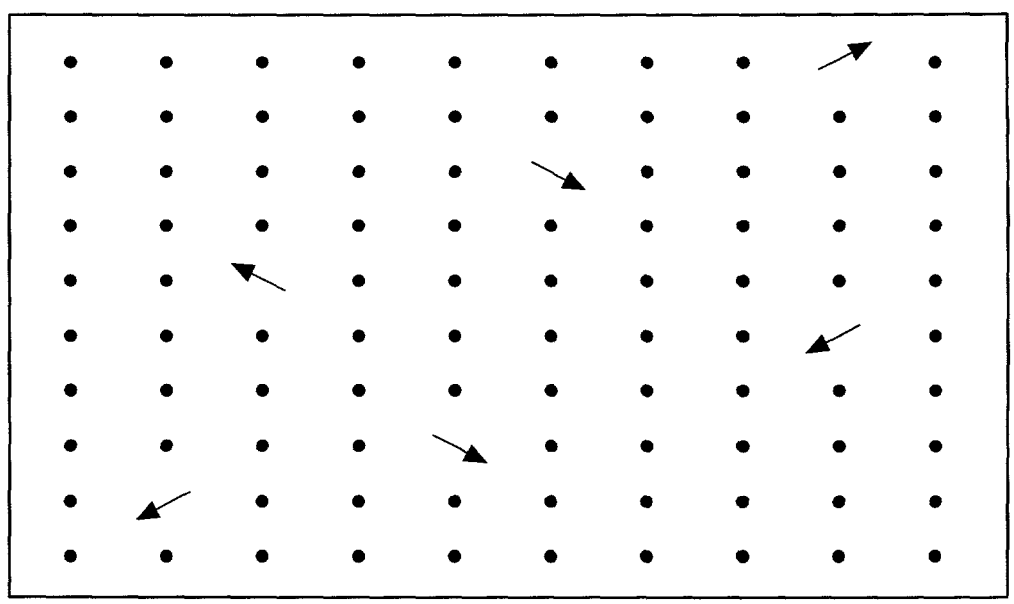

FIG. 7A shows the people in the audience intently watching and/or listening to the movie. In this case, the motion vectors are as shown in FIG. 7B, where there is no movement induced by the movie being presented, either at the macroscopic or microscopic level.

Thus, the observation of the motion vectors based on the video signal SV1 makes it possible to identify those three major types of the overall state of the audience.

The motion vector determination unit 32 therefore determines to which of these three categories the observed motion vectors belong and outputs the result of the determination in the form of the image determination signal SSV.

Thus, the image determination signal SSV, as the information identifying the three states of the audience Va, Vb and Vc shown in FIG. 8, is supplied to the determination processing unit 12. Specifically, the image determination signal SSV indicates either a stationary state (Va), an orderly motion state (Vb), or a random motion state (Vc) based on the observation of the motion vectors.

When the image determination signal SSV indicates the stationary state (Va), it is estimated that the people in the audience are watching or listening intently, as shown in FIG. 7A.

When the image determination signal SSV indicates the orderly motion state (Vb), it is estimated that the people in the audience are exhibiting an orderly movement such as hand clapping and other forms of action in sync with the music, for example, as shown in FIG. 6A.

When the image determination signal SSV indicates the random-motion state (Vc), it is estimated that the people in the audience are clapping their hands, for example, as shown in FIG. 5A.

As shown in FIG. 4, the detection signal processing unit 11 comprises, as processing blocks for the audio signal SA, an audience audio extraction unit 33 and an audio feature detection unit 34.

The audience audio extraction unit 33 removes from the audio signal SA any noise components introduced during the detection process to extract the audio components that are actually generated by the audience. The extracted audio components are output as an audio signal SA1.

The sound collected by the microphones 5 contains the audio components output via the speaker 3, i.e., the audio data component of the content being presented. Such audio data component is obviously not coming from the audience and should be regarded as noise picked up during the detection process.

To cancel out this audio data component, the audience audio extraction unit 33 receives the audio data Aout being played back by the server 9 and subtracts it from the audio signal SA. Thus, the audio signal SA1 is obtained which has no extraneous audio data component.

The audio signal SA collected by the microphones 5 from the audience is also influenced by the acoustic characteristics of the hall, such as its size and structure. There are also fixed noise components, such as from the air conditioning equipment in the hall. However, the acoustic characteristics of the hall due to, e.g., the structure of the hall, are known in advance. Accordingly, the audience audio extraction unit 33 receives, as a fixed value, information Af corresponding to the components uniquely associated with the particular hall where the system is installed and affecting the audio signal SA. The audience audio extraction unit 33 then cancels out these influences due to the hall (by, for example, correcting the acoustic characteristics or canceling the noise components from the air conditioner).

Thus, the audience audio extraction unit 33 removes from the collected sound signal SA the speaker output and other influences and noise due to the acoustic characteristics associated with the structure of the particular hall. The audio signal SA1 output from the audience audio extraction unit 33, therefore, strictly represents the sounds actually generated by the audience, such as their voices and clapping of hands.

The above-mentioned influences of the structure of the hall may also affect the image signal SV. For example, opening and closing of the doors or other moving objects may be captured in the image signal SV. If such influence by the hall structure is likely, the influence, which is fixed, may be canceled out of the image signal SV1 in the same manner as in the case of the audio signal SA.

The audio signal SA1 is input to the audio feature detection unit 34 where the features of the audio signal are determined and an audio determination signal SSA is generated.

Figure 9:
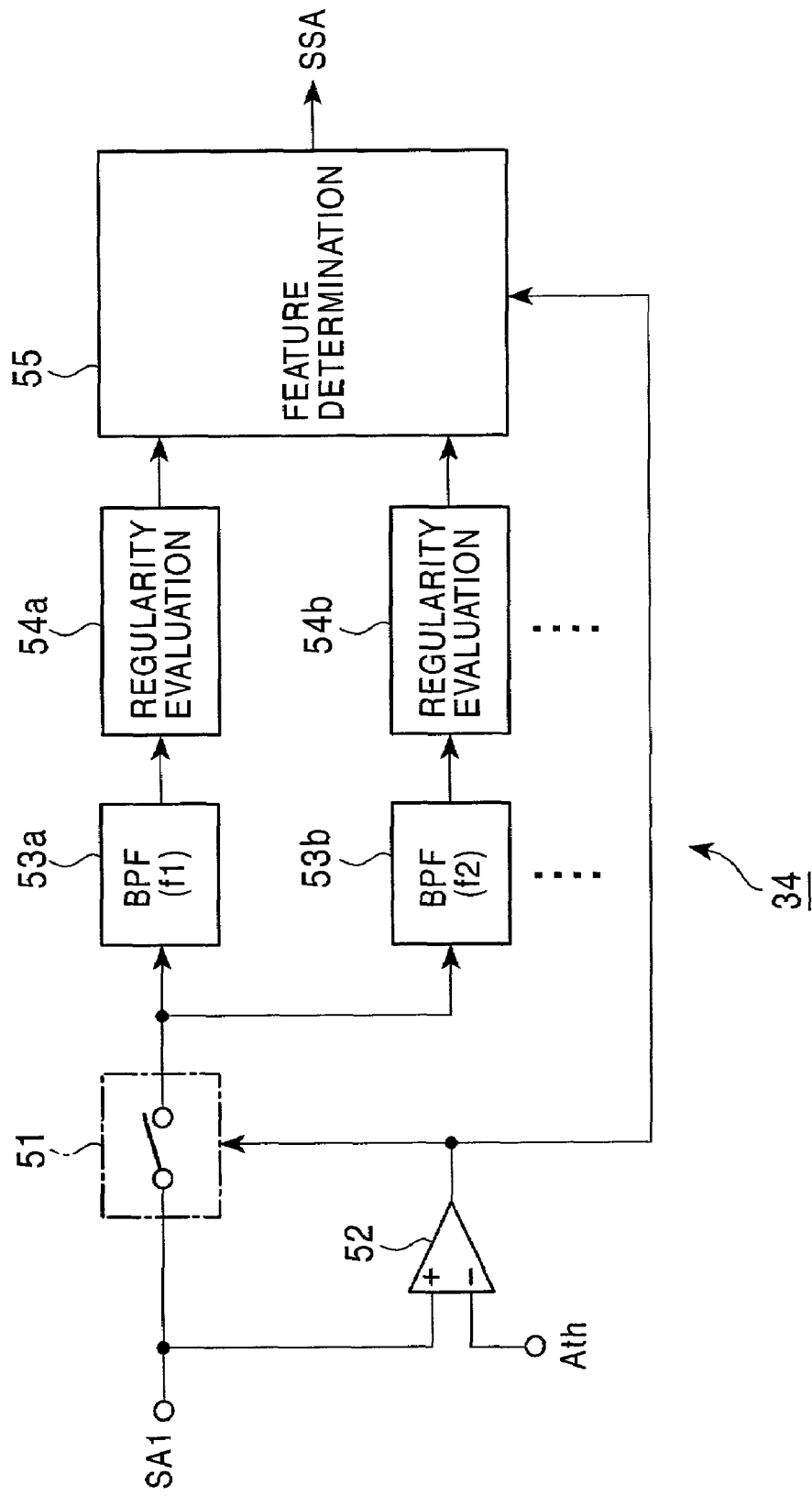
FIG. 9 is a block diagram of an audio feature detection unit in the embodiment.

As shown in FIG. 9, the audio feature detection unit 34 comprises a detection unit 52 for detecting a below reference-volume state (a silent state) by comparing the audio signal SA1 and a reference level Ath. The audio feature detection unit 34 also comprises a switch 51 for interrupting the audio signal SA1, and a required number of band-bass filters 53a, 53b, . . . , with different pass bands. The audio feature detection unit 34 further comprises regularity evaluation units 54a, 54b, . . . , receiving outputs from the respective band-pass filters 53a, 53b, . . . , and a feature determination unit 55.

As mentioned above, the detection unit 52 compares the audio signal SA1 with the reference level Ath to output a comparison result signal indicating whether or not the volume level of the audio signal SA1 exceeds the reference level Ath. The comparison result signal indicates whether or not the audience is in a silent state on the basis of the level of the sound generated by the audience. Accordingly, the reference level Ath is set as an upper threshold of the volume below which the audience can be considered silent.

The reference level Ath is supplied from an audience state determination unit 41, which will be described later, in the determination processing unit 12 shown in FIG. 4. The audience state determination unit 41 variably sets the reference level Ath, i.e., the threshold value at which the audience can be considered silent, according to the current number of people in the audience or audience size. The audience size is determined on the basis of detection signals supplied from the load sensor 6 and the stepping force sensor 7, as will be described later.

The comparison result signal indicating whether or not the audience is in the silent state is thus output from the detection unit 52 and then supplied to the switch 51 and the feature detection unit 55.

When the comparison result signal indicates the silent state, the switch 51 is turned off, so that the signal SA1 may not be supplied to the band-pass filters 53a, 53b, . . . In this case, the feature determination unit 55 determines that the audience is in the silent state based on the value of the comparison result signal.

When the audience is not in the silent state, the switch 51 is turned on, and the audio signal SA1 is supplied to the band-pass filters 53a, 53b, . . .

The band-pass filters 53a, 53b, . . . , have pass bands for different audio bands. For example, the band-pass filter 53a has a pass band f1 which is adapted for the human voice. The band-pass filter 53b has a pass band f2 adapted for the sound of people clapping hands.

In the present embodiment, only two band-pass filters, i.e., the band-pass filters 53a and 53b, are used for the extraction of the voice component and the hand-clapping component of the sounds generated by the audience, respectively, for simplicity's sake. However, the number and the pass bands of the band-pass filters may be set as required for particular purposes of sound feature determination. For example, when the response of the female audience and that of the male audience should be separately detected, there may be provided band-pass filters adapted for the extraction of signal components of female and male voice frequency bands separately.

The band-pass filter 53a extracts the human voice band component from the audio signal SA1 and supplies it to the regularity evaluation unit 54a. On the other hand, the band-pass filter 53b extracts the hand-clapping band component from the audio signal SA1 and supplies it to the regularity evaluation unit 54b.

The respective regularity evaluation units 54a and 54b evaluate the thus input audio signals in terms of regularity along the time axis within a predetermined evaluation period. The evaluation includes, for example, determination of a ratio between a local dynamic range and a macro-dynamic range within the evaluation period.

Specifically, sounds of the audience clapping their hands or singing in unison with music, for example, exhibit regularity to some extent, while applause and cheering are irregular and chaotic.

For example, FIG. 10A shows the sound pressure level variation within the evaluation period, exhibiting regularity, while FIG. 10B shows a sound pressure variation with a highly random nature.

The results of regularity evaluation in the respective regularity evaluation units 54a and 54b are supplied to the feature determination unit 55. Based on the results of the regularity evaluation of the audio components extracted by the band-pass filters 53a and 53b, the feature determination unit 55 then generates an audio determination signal SSA for the estimation of the audience response.

Thus, in the present embodiment, the feature determination unit 55 generates the audio determination signal SSA on the basis of such factors as whether the audience's voice is regular or random, whether the audience's hand clapping is regular or random, or whether or not the audience is in the silent state based on the result of detection in the detection unit 52. The audio determination signal SSA is then output to the determination processing unit 12.

The audio determination signal SSA is supplied to the determination processing unit 12 as information identifying five states Aa, Ab, Ac, Ad, and Ae shown in FIG. 11. Specifically, the five states, which are based on the result of determination in the feature determination unit 55 using the above-mentioned factors, indicate a silent state (Aa), an orderly voice state (Ab), a random voice state (Ac), an orderly hand clapping state (Ad), and a random hand clapping state (Ae).

When the audio determination signal SSA indicates the silent state (Aa), it is estimated that the people in the audience are intently watching or listening.

When the audio determination signal SSA indicates the orderly voice state (Ab), it is estimated that the people in the audience are singing along with the music, responding to calls from the performer, or cheering in unison.

When the audio determination signal SSA indicates the random voice state (Ac), it is estimated that the people in the audience are cheering, for example.

When the audio determination signal SSA indicates the orderly hand clapping state (Ad), it is estimated that the people in the audience are clapping their hands to the beat of the music or in anticipation of an encore, for example.

When the audio determination signal SSA indicates the random hand clapping state (Ae), it is estimated that the people in the audience are simply clapping their hands.

As shown in FIG. 4, the detection signal processing unit 11 comprises a load detection unit 35 as a processing block for the load detection signal SW. As mentioned above, the load sensor 6 is provided for each of the seats ST and therefore as many load detection signals SW1-SW(n) are generated as the number n of the seats. Accordingly, there are load detection units 35-1 to 35-n corresponding to the respective load detection signals SW1-SW(n).

The load detection units 35-1 to 35-n compare the load detection signal SS1-SW(n) with a predetermined reference value Wth1 in each case, and output, as a result of the comparison, load determination signals SSW1-SSW(n) indicating the presence or absence of a load.

When a member of the audience P is seated in one of the seats ST as shown in FIG. 12A, for example, a load due to the member's weight is applied to the load sensor 6 and the stepping force sensor 7 in a distributed manner. Accordingly, the load sensor 6 outputs a load detection signal SW with a level depending on the weight of the spectator. On the other hand, when the spectator is standing as shown in FIG. 12B, the load due to the weight of the spectator is applied only to the stepping force sensor 7, so that the load detection signal SW output by the load sensor 6 has a zero level, indicating the absence of a load applied to the load sensor 6.

The reference value Wth1 is preferably set at a value corresponding to a load ranging from several kilograms to several tens of kilograms, so that a child weighing not much can be included while excluding belongings and the like.

The load determination signal SSW obtained as a result of the comparison between the reference value Wth1 and the load detection signal SW is supplied to the determination processing unit 12 as information identifying the two states of Wa and Wb, for example, as shown in FIG. 14. Specifically, the load determination signal SSW indicates either the presence (Wa) or absence (Wb) of a load due to the spectator.

When the load determination signal SSW indicates the presence of a load (Wa), it is estimated that the spectator is seated.

When the load determination signal SSW indicates the absence of a load (Wb), it is estimated that the spectator is either standing or absent.

As shown in FIG. 4, the detection signal processing unit 11 comprises a stepping force detection unit 36 as a processing block for the stepping force detection signal SF. As mentioned above, the stepping force sensor 7 is provided for each of the seats ST, so that as many stepping force detection signals SF1-SF(n) are generated as the number n of the seats ST. Accordingly, there are stepping force detection units 36-1 to 36-n provided for the respective stepping force detection signals SF1-SF(n).

The respective stepping force detection units 36-1 to 36-n compare the stepping force detection signals SF1-SF(n) with a predetermined reference value Wth2 to thus determine whether the load is large or small (or absent).

Figure 13A:
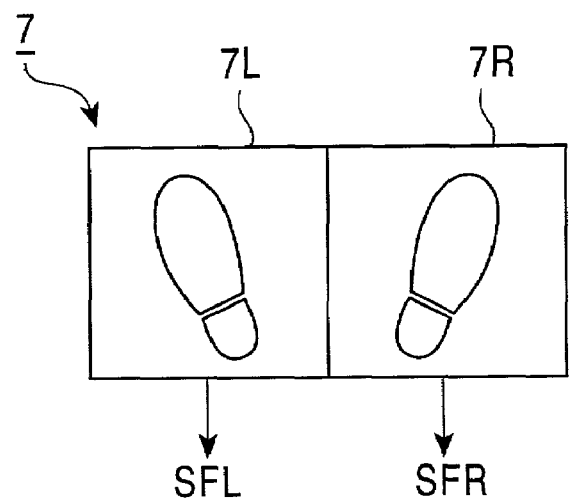
FIGS. 13A and 13B are a drawing and graphs, respectively, for the explanation of the stepping force sensor in the embodiment.

Each stepping force sensor 7 is further divided into a left detection portion 7L and a right detection portion 7R as shown in FIG. 13A, producing a left stepping force detection signal SFL by the left foot load and a right stepping force detection signal SFR by the right foot load.

The respective stepping force detection units 36-1 to 36-n estimate the shifting in the center of gravity of each member of the audience by observing changes in the load values indicated by the stepping force detection signals SFL and SFR. Specifically, the stepping force detection units 36-1 to 36-n determine whether the audience are moving in an orderly or a random manner based on the presence or absence of regularity in the shift in the center of gravity with time.

Then, the stepping force detection units 36-1 to 36-n output stepping force determination signals SSF1-SSF(n) indicating whether the load is large or small (or absent) and whether there is order or randomness.

As described above with reference to FIG. 12, when a spectator is seated in one of the seats ST, the load by his weight is only lightly put on the stepping force sensor 7. On the other hand, when he is standing, the load due to his weight is exclusively put on the stepping force sensor 7. It goes without saying that when no spectator is seated in the seat, no load is applied to the stepping force sensor 7.

The respective stepping force detection units 36-1 to 36-n determine whether the load is large or small (or absent) by comparing the value of the sum of the stepping force detection signals SFL and SFR with the reference value Wth2.

For example, when a spectator is standing and his full weight is being put on the stepping force sensor 7, the value of the sum of the stepping force detection signals SFL and SFR corresponds to the spectator's weight.

The reference value Wth2, therefore, is set at a value corresponding to a load of several tens of kilograms, for example, taking into consideration children with relatively low weights and the load applied by a sitting spectator. Thus, it can be estimated that the spectator is standing when the load exceeds the reference value Wth2, and that the spectator is either sitting or absent when the load is either smaller than the reference value Wth2 or zero.

Further, the respective stepping force detection units 36-1 to 36-n determine whether the spectator' movement is orderly or random by observing and comparing the values of the stepping force detection signals SFLs and SFRs individually along the time axis.

Figure 13B:
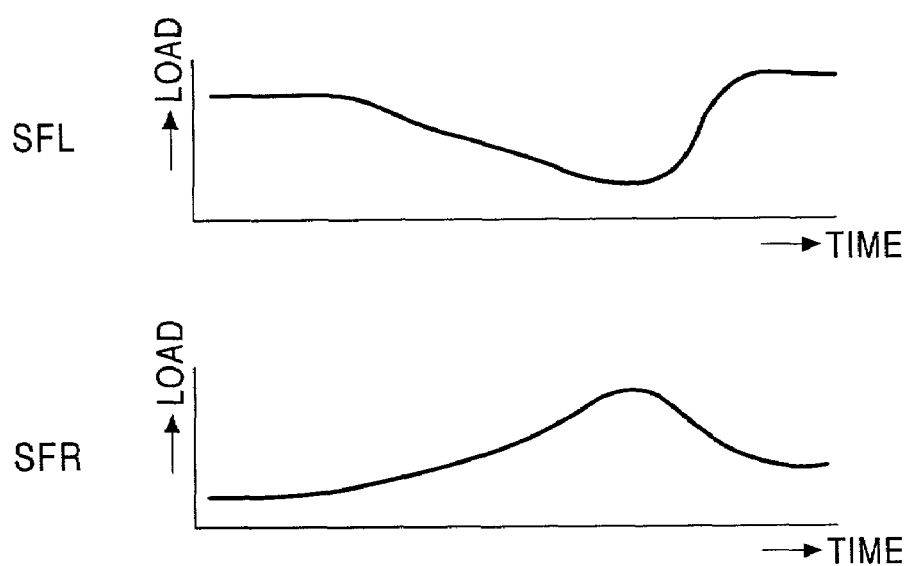

For example, if the stepping force detection signals SFL and SFR vary as shown in FIG. 13B, this shows that during the particular period shown, the center of gravity of the spectator has shifted from the left leg to the right leg. Thus, if such shift in the center of gravity repeats itself, i.e., from right to left and back to right . . . etc., it can be determined that the spectator is moving his body to the beat of the music, for example.

On the other hand, if the shift in the center of gravity is observed intermittently and randomly along the time axis, it can be determined that the spectator is moving in a random manner.

If, furthermore, there is no shift in the center of gravity for a predetermined period of time, it can be determined that the spectator is not standing and moving.

The individual stepping force detection units 36-1 to 36-n thus process the stepping force detection signals SF1-SF(n), and output the results as the stepping force determination signals SSF1-SSF(n).

The stepping force determination signals SSF1-SSF(n) are then supplied to the determination processing unit 12 as information identifying four states of Fa, Fb, Fc and Fd, for example, as shown in FIG. 15.

Specifically, the stepping force determination signal SSF identifies either the state where the spectator's load is small or absent (Fa), the state where the spectator's load is large and with no movement (Fb), the state where the spectator's load is large and the movement is orderly (Fc), and the state where the spectator's load is large and the movement is random (Fd).

When the stepping force determination signal SSF indicates a small load or absence of a load (Fa), it can be estimated that the spectator is either seated or absent.

When the stepping force determination signal SSF indicates a large load with no movement (Fb), it can be estimated that the spectator is standing but not moving.

When the stepping force determination signal SSF indicates a large load with an orderly movement (Fc), it can be estimated that the spectator is standing and moving his body to the beat of the music, for example.

When the stepping force determination signal SSF indicates a large load with a random movement (Fd), it can be estimated that the spectator is standing and moving his body in a random manner.

Thus, the detection signal processing unit 11 generates the respective determination signals (SSV, SSA, SSW and SSF) on the basis of the information supplied from the various sensors (video camera 4, microphones 5, load sensor 6, and stepping force sensor 7) and supplies them to the determination processing unit 12.

The states indicated by the predetermined values of the respective determination signals (SSV, SSA, SSW and SSF) are not limited to those shown in FIGS. 8, 11, 14 and 15. That is, more detailed states may be determined by modifying the detection processing methods.

For example, the image determination signal SSV obtained as a result of observing the motion vectors may, in the case of orderly movement, distinguish a rhythmical hand clapping from other actions, or determine a movement like a wave by the entire audience.

Furthermore, the load determination signal SSW and stepping force detection signal SSF may indicate the load more finely in order to determine whether the spectator is an adult or a child.

3. Determination/control processing in the determination processing unit

As shown in FIG. 4, the determination processing unit 12 comprises an audience state determination unit 41 and a control decision unit 42.

The audience state determination unit 41 estimates the current state of the audience on the basis of the values of the above-mentioned respective determination signals (SSV, SSA, SSW and SSF) and by referring to the auxiliary information IP supplied from the server 9, which indicates the current playback content.

In accordance with the result of estimation by the audience state determination unit 41, the control decision unit 42 outputs control signals Cdb and Csp controlling the selection of content data to be played back and predetermined processing of the playback video data Vout and audio data Aout.

Figure 16:
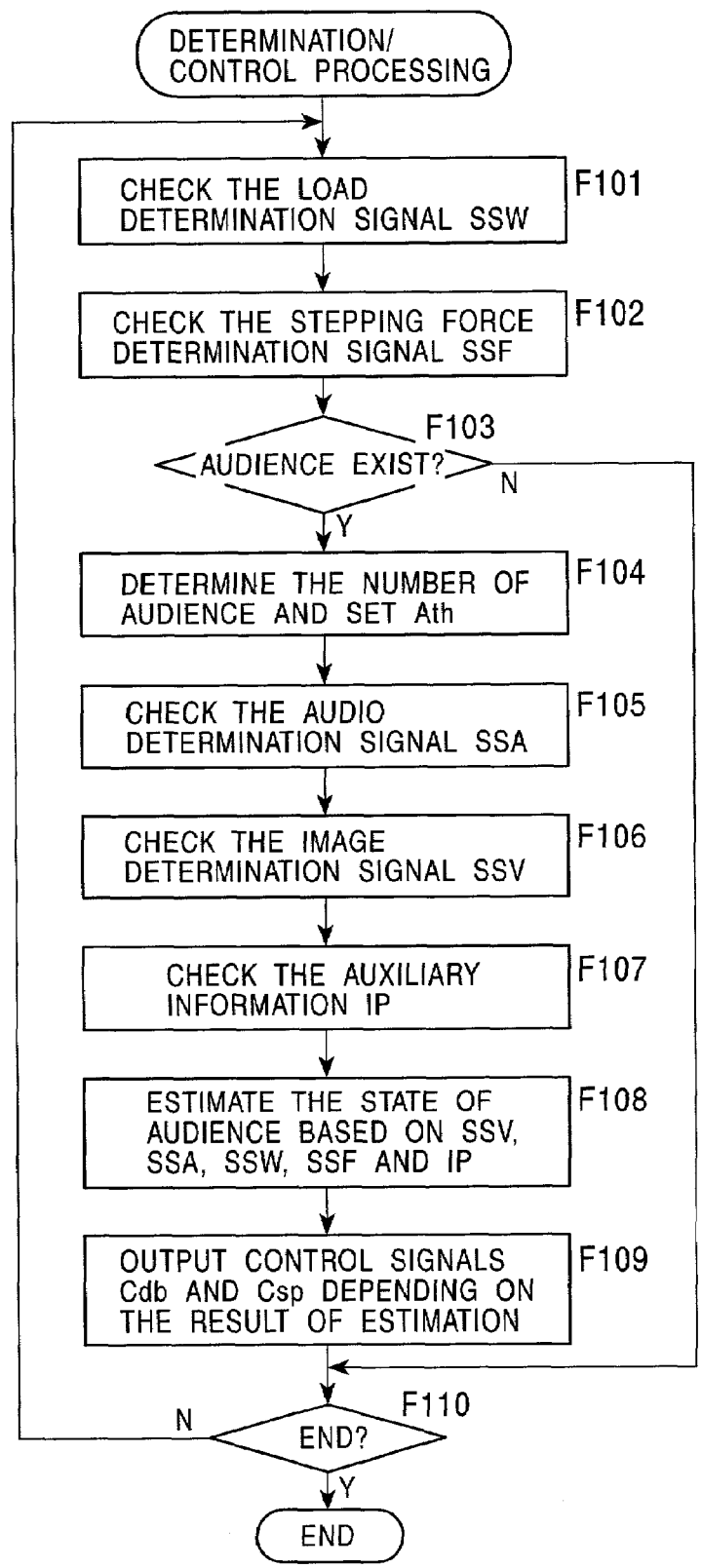
FIG. 16 is a flowchart of determination/control processing in the embodiment.

FIG. 16 shows a flowchart of the determination/control processing performed in the determination processing unit 12. In this flowchart, step F109 is performed by the control decision unit 42 while other steps are performed by the audience state determination unit 41.

In step F101, the audience state determination unit 41 checks the load determination signals SSW1-SSW(n). Specifically, the information concerning the presence or absence of a load (i.e., the information indicating either Wa or Wb in FIG. 14) in each of the seats ST in the hall are taken in.

In step F102, the stepping force detection signals SSF1-SSF(n) are checked by taking in the information concerning, for each one of the seats ST in the hall, whether the load on the stepping force sensor 7 is large or small (or absent), and whether the spectator's movement is absent, orderly or random (i.e., the information identifying Fa-Fd in FIG. 15).

In step F103, it is determined if there is any spectator in the hall on the basis of the values of the load determination signals SSW1-SSW(n) and stepping force determination signals SSF1-SSF(n).

If the load determination signal SSW1 indicates Wb (no load) and at the same time the stepping force determination signal SSF1 indicates Fa (no or small load), it can be estimated that there is no spectator in the particular seat. Accordingly, if the same applies to all of the seats ST, it can be determined that there is no spectator in the hall.

In that case, the procedure goes from step F103 to F110 and, unless the procedure is to be terminated, returns back to step F101.

If there is at least one spectator, the procedure goes to step F104, where the audience size is determined. This can be done by subtracting the number of seats where it was determined in step F103 there were no audience from the total number of the seats. Alternatively, the number of those seats may be counted that satisfy the OR condition that the load determination signal SSW does not indicate Wb (no load), or the stepping force determination signal SSF does not indicate Fa (no or small load).

When the audience size is determined, then the reference value Ath to be supplied to the audio feature detection unit 34 is set accordingly. As described with reference to FIGS. 4 and 9, the reference value Ath is for determining whether or not the audio signal SA1 is within the silent state level. Thus, the reference value for the determination of the silent state varies depending on the audience size so as to ensure an accurate estimation.

Thereafter, the audience state determination unit 41 checks the audio determination signal SSA in step F105 to identify which of the states Aa-Ae shown in FIG. 11 the signal SSA indicates.

In step F106, the audience state determination unit 41 also checks the image determination signal SSV to identify which of the states Va-Vc shown in FIG. 8 the signal SSV indicates.

Furthermore, in step F107, the audience state determination unit 41 identifies the auxiliary information IP supplied from the server 9.

Thus identifying the values of the respective determination signals (SSV, SSA, SSW and SSF) and the auxiliary information IP, the audience state determination unit 41 then estimates the actual response of the audience based on these values. Examples of the estimation will be described later.

After the response of the audience has been estimated, the audience state determination unit 41 sends a signal indicating the determined audience response to the control decision unit 42. In step F109, the control decision unit 42 processes the audience response and outputs the control signals Cdb and Csp for carrying out necessary operations. Examples of the controls will be described later.

In step F110, it is determined whether the determination/control processing should be terminated. If not, the procedure goes back to step F101. If it is judged that the procedure is to be terminated based e.g. on a termination instruction input via an operation unit (not shown) operated by an operator, the procedure comes to an end after step F110.

While the audience state determination unit 41 may estimate various types of audience response in step F108, it is assumed in the following that five types of response J1-J5 shown in FIG. 17 are estimated.

Response J1 is where most of the people in the audience are intently watching or listening to the content being presented.

Response J2 is where most of the people in the audience are clapping their hands or singing along with the music being played back.

Response J3 is where most of the people in the audience are clapping their hands or uttering voices in unison when demanding an encore, for example.

Response J4 is where most of the people in the audience are applauding or cheering.

Response J5 is where most of the people in the audience are standing.

Those five types of audience response are estimated in step F108 on the basis of the values of the respective determination signals (SSV, SSA, SSW and SSF) and the auxiliary information IP, and by referring to a matrix shown in FIG. 18.

When the people in the audience are in fact watching or listening intently, it is very likely that the respective determination signals assume the following values:

Image determination signal SSV=Va (stationary);
Audio determination signal SSA=Aa (silent);
Load determination signal SSW=Wa (load present); and
Stepping force determination signal SSF=Fa (load small).

In other words, if those conditions are all met, it can be estimated that the audience response is almost surely J1, i.e., the audience intently watching and/or listening. And even if not all of the conditions are met, if three of the conditions, such as those concerning the image, audio and load, or two of the conditions, such as those concerning the image and audio, are met, it can be estimated that the audience response is J1. In some cases, it may even be alright to estimate response J1 if either the image or audio condition is met.

While the load determination signal SSW includes SSW1-SSW(n), the load determination signal SSW shown in FIG. 18 may be thought of as that of a representative value of the n number of load determination signals. For example, if a dominant one of the values of the n number of load determination signals SSW1-SSW(n) is Wa, it may be considered that the load determination signal SSW=Wa.

The same applies to the stepping force determination signal SSF.

When the people in the audience are in fact seated and exhibiting an orderly movement in response to the content, for example, it is very likely that the respective signals show the following values:

Image determination signal SSV=Vb (orderly movement);
Audio determination signal SSA=Ab (orderly voice) or Ad (orderly hand clapping);
Load determination signal SSW=Wa (load present); and
Stepping force determination signal SSF=Fa (load small).

Thus, if all or some of those conditions are met, it can be estimated that the people in the audience are almost surely exhibiting an orderly movement in response to the content.

In this case, if the auxiliary information IP shows that music is being output, it can be estimated that the people in the audience are clapping their hands or singing along with the music, that is, their response is J2.

On the other hand, if it is confirmed that there is no music being output, it can be determined that the audience's movement is not in response to the music. Instead, it can be estimated that, if the movie is being played back, the people in the audience are exhibiting some form of action in response to the movie, such as rhythmically clapping their hands or uttering voices. And if such actions are taking place following the end of the playback, it can be estimated that the audience is demanding an encore or curtain call (by clapping their hands or saying "Encore!" in unison). Hence, their response is J3.

When the audience is in fact exhibiting random actions while seated, it is very likely that the respective determination signals indicate the following values:

Image determination signal SSV=Vc (random movement);
Audio determination signal SSA=Ac (random voice) or Ae (random hand clapping sound);
Load determination signal SSW=Wa (load present); and
Stepping force determination signal SSF=Fa (load small).

Accordingly, if all or some of these conditions are met, it can be estimated that the people in the audience are almost surely exhibiting a random movement (J4), such as applause.

When the people in the audience are in fact standing, it is very likely that the respective determination signals indicate the following values:

Image determination signal SSV=VA-Vc (any of the states possible);
Audio determination signal SSA=As-Ae (any of the states possible);
Load determination signal SSW=Wb (no load); and
Stepping force determination signal SSF=Fb-Fd (any of the states with large load).

Thus, if the load determination signal SSW and the stepping force determination signal SSF among others satisfy the specified conditions, it can be estimated that the people in the audience are standing (J5).

Accordingly, the five types of audience response J1-J5 shown in FIG. 17 can be sufficiently correctly distinguished by judging the values of the respective determination signals as described above.

After thus estimating the audience response in step F108 of FIG. 16, necessary control is performed in accordance with the estimated response in step F109. The control includes, as also shown in FIG. 17, the following.

In the case of response J1, there is no special control needed, and simply the video and audio components of the content may be normally output.

In the case of response J2, a sound effects processing is performed such as by increasing the volume level of the audio data Aout by the control signal Csp, so that the music can be heard clearly in spite of the hand clapping or chorus. Also, the lyrics are superposed on the video data Vout in the form of text data so as to help the audience sing along. The text data about the lyrics associated with the content may be read from the databases 21 by having the control signal Cdb instruct the server 9.

In the case of response J3, if the content is being played back, a sound effect processing is performed such as by increasing the volume level of the audio data Aout, so that the music can be heard clearly in spite of hand clapping or chorus.

If the content is not being played back and it is determined that the audience is calling for an encore, the control signal Cdb instructs the server 9 to repeat the playback of the content or to add or change the content to be presented.

In the case of response J4, such a sound effect processing is performed as increasing the volume level of the audio data Aout by the control signal Csp, so that the audio content can be heard clearly in spite of the hand clapping and cheering.

In addition, since it can be assumed that in this case, the current scene is attracting the attention of the audience, the particular scene may be marked and stored for later use during the encore. Alternatively, the control signal Cdb may instruct the server 9 to play back the scene repeatedly.

Furthermore, such video data processing may be performed as varying the luminance dynamic range to make the most of the popular scene.

In the case of response J5, too, it can be assumed that the scene is exciting or being well-received. Therefore, the control signal Cdb instructs the server 9 to mark and store the scene for later use during the encore, or play back the scene repeatedly.

In this case, since the people in the audience are standing, such video data processing is performed as shifting the image presentation position upward on the screen 1, or enlarging the image to the full extent of the screen, so that the audience can see the movie easily. Also, the luminance may of course be varied.

Furthermore, sentences may be superposed on the video data Vout, or an announcement may be output, suggesting the audience to be seated.

Thus, in the present embodiment, the content to be played back or the played back signals (video data Vout and audio data Aout) are controlled in accordance with the audience response. This makes it possible to adapt the playback to the audience response and to increase the level of satisfaction felt by the audience. In particular, by selectively controlling the content to be played back, it becomes possible to repeatedly play back the encore scene desired by the audience, or play back the kind of content to the audience's liking. Further, by controlling the signal processing on the playback data, the visual effects, sound effects, volume, etc., can be adapted to the audience response.

4. Various modifications

The above description concerns just one embodiment of the present invention, and a variety of other examples may be conceived. For example, the estimated types of the audience response, the control methods to be employed in view of the estimation results, the type of the hall and the method of detecting the state of the audience may all vary depending on the type of the hall, the nature of the event and the facilities that can be controlled. In the following, various modivications of the above-described embodiment will be described.

First, concerning the types of audience response, while the five types of audience response J1-J5 shown in FIG. 17 were estimated in the above embodiment, the determination signals (SSV, SSA, SSW and SSF) and the value (or the type) of the auxiliary information IP may be used for the estimation of other types of audience response.

For example, the standing response J5 may be further classified into the following categories:

People in the audience are standing and intently watching and/or listening.

People in the audience are standing and rhythmically clapping their hands or singing along.

People in the audience are standing and clapping their hands.

People in the audience are standing and cheering.

People in the audience are standing and singing along with the music and the like.

People in the audience are standing and exhibiting some action such as clapping their hands to the beat of the music and the like.

It should be obvious that those states can be estimated by determining which one of Fb, Fc and Fd the value of the stepping force determination signal SSF assumes or by referring to the values of the image determination signal SSV and the audio determination signal SSA, when the load determination signal SSW=Wb.

Furthermore, the values of the respective determination signals may be used for the estimation of audience response such as:

People in the audience are exhibiting an action in step with the video.

People in the audience are stepping up and down their feet to the rhythm of the video or music.

People in the audience are shouting or singing together without clapping their hands.

Furthermore, if the audience size is seen to be gradually decreasing, it can be estimated that the content is unpopular. If many in the audience are often leaving and returning to their seats, it can be estimated that the atmosphere in the hall is dull.

It is also possible to estimate whether the content is popular among the male or female audience, or if a booing is going on, based on the audio determination signal SSA, as mentioned above.

It is also possible to estimate whether the audience consists mainly of children or of adults by more finely determining the detected load values of the load determination signal SSW and the stepping force determination signal SSF.

Other control operations performed on the basis of the estimation result include the following.

With regard to the selection of the content data by the control signal Cdb, it is possible to replace an unpopular scene with a different scene, or to select or change the subsequent scenes or story depending on the audience response. In this case, moreover, the story control system in which the audience response is taken into account may be disclosed to the audience beforehand. That way, a presentation system may be realized where the audience can express explicit demands (reactions to the content) and thereby actively alter the content of the movie and the like.

Further, several alternatives may be incorporated in the presented content. By having the audience clap their hands when their favorite choice is shown, the content to be played back may be selectively determined depending on the amount of hand clapping.

In addition to the control performed on the content selection or the image and audio processing on the playback data, various facilities in the hall may be controlled.

For example, the brightness or color of the illumination may be controlled by controlling illumination equipment, or other visual effects may be provided by activating a mirror ball or a laser beam of light in response to the audience response, thereby boosting the audience's excitement.

Furthermore, the air conditioning facility may be controlled to provide a better environment for the audience. For example, when there is not much movement among the audience, i.e., when the people in the audience are intently watching or listening, the temperature inside the hall may be increased. Conversely, when the audience are standing and dancing, for example, the temperature may be decreased.

In the embodiment described earlier, the image signal SV and audio signal SA detected by the video camera 4 and microphones 5, respectively, were used as the overall information about the audience. Also, the load detection signal SW and stepping force detection signal SF detected by the load sensor 6 and stepping force sensor 7, respectively, were used as the information about the individual members of the audience. However, these are not to be taken as limiting the present invention.

For example, a video camera and a microphone may be provided for each seat in order to detect the image of and the sound generated by each member of the audience. Also, the information obtained from the load sensors and stepping force sensors may be used as the overall information about the entire audience.

Furthermore, the image, sound, load and the like may be detected on an area-by-area basis, in addition to the overall/individual basis.

The information for the estimation of the response of the audience may further include outputs from other sensors or some other forms of information. For example, an investigation may be conducted in the form of a questionnaire or orally by movie theater employees to determine the type of the audience prior to the start of the movie. The resultant information may be fed back for the estimation and various control operations. Other information such as the time of the day when the movie is shown, the season, date, temperature, the location of the hall, etc., may also be used for the estimation and various kinds of control.

While in the above embodiment the concept of the present invention was applied in the hall where a movie is shown, this should not be taken as limiting the scope of the invention. For example, the present invention may be embodied in a concert hall, live music house, theater, vaudeville theater, broadcast studio, open-air hall, stadium, multipurpose hall, etc.

For example, during a live performance or sport event, the performers or players are often shown on a monitor screen for the audience. In such cases, popular scenes of the musicians playing the music or close-ups of the sport players may be shown, or sound effects and music may be provided, in accordance with to the audience response.

The estimated responses of the audience may be displayed for people such as the performer, director and operator to see, rather than being used for controlling the output content and the like.

This makes it possible for the performers, for example, to change the content of their performance or play, or to control or set visual and sound effects, on the basis of the estimated responses of the audience. It may also be possible to change the program for subsequent days depending on the audience response.

5. A software solution for the implementation of the embodiment of the invention Hereafter an example of software for the realization of the embodiment will be described.

The functions of the detection and control unit 10 and server 9 in the above embodiment may be performed by either hardware or software. The same goes for the detection signal processing unit 11 and determination processing unit 12 in the detection and control unit 10, and to the audience state determination unit 41 and control decision unit 42 in the determination processing unit 12.

When the various functions of the respective units are to be performed by software, a program is installed in a computer built inside the transmission and reception apparatus or recording and playback apparatus as dedicated hardware, or in a general-purpose computer.

Figure 19:
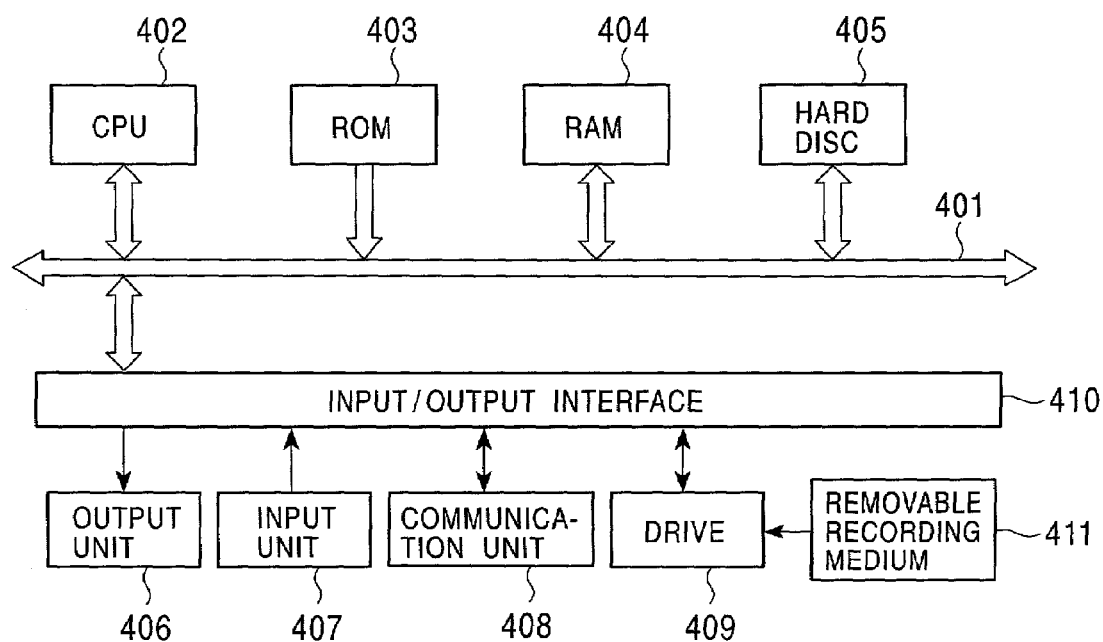
FIG. 19 is a block diagram of a computer configuration for realizing the embodiment.

FIG. 19 shows an example of the structure of the computer in which the program for carrying out the various functions is installed.

The program may be previously stored in a recording medium such as a hard disc 405 or a ROM 403 built inside the computer.

Alternatively, the program may be temporarily or permanently stored (recorded) in a removable recording medium 411 such as a floppy disc, a CD-ROM (compact disc read-only memory), an MO (magneto-optical) disc, a DVD (digital versatile disc), a magnetic disc, and a semiconductor memory. Such removable recording medium 411 may be provided as the so-called package software.

Besides being installed from the removable recording medium 411 to the computer, the program may be transferred by wireless from a download site to the computer via a satellite for digital satellite broadcasting. The program may also be transferred by wire from the download site to the computer via networks such as a LAN (local area network) or the Internet. The computer may receive the thus transferred program via a communication unit 408 and then install it in the built-in hard disc 405.

The computer comprises a CPU (central processing unit) 402. The CPU 402 is connected with an input/output interface 410 via a bus 401. An input unit 407 comprises a keyboard, a mouse, and a microphone. As a user operates the input unit 407 and inputs instructions via the input/output interface 410, the CPU 402 executes the program stored in a ROM (read-only memory) 403 according to the instructions. Alternatively, the CPU 402 may load the program stored or installed in the hard disc 405 onto a RAM 404 (random access memory) and then execute it. The program installed in the hard disc 405 may have been transferred from the satellite or networks and then received by the communication unit 408, or read from the removable recording medium 411 mounted on a drive 409. Thus, the CPU 402 performs the various kinds of processing shown in the above-mentioned flowchart.

The processing result is either output from an output unit 406 comprising an LCD (liquid crystal display) and a speaker, transmitted from the communication unit 408, or recorded in the hard disc 405, via the input/output interface 410, under the control of the CPU 402.

In the above description, the processing steps describing the program for having the computer execute various kinds of processing were performed in the order of the flowchart as shown in FIG. 16. However, this is not to be taken as limiting the scope of the present invention. For example, the processing steps may be performed in parallel or individually (i.e., by parallel processing or object-based processing, for example).

The program may be processed either by a single computer or in a distributed manner by a plurality of computers. Further, the program may be transferred to and processed by a remotely located computer.

Thus, in accordance with the present invention, the audience response is determined by detecting the overall and individual states of the audience. Accordingly, the audience response to the movie, performance and the like can be accurately identified.

This makes it possible, in the case of a movie, for example, to control the playback of the film based on the audience response, thereby increasing the level of satisfaction felt by the audience.

In particular, by selectively controlling the playback content, scenes that the audience wants to see the most can be repeatedly played back, or the content may be adapted to the audience's preferences.

Further, the sound and video effects, the volume level of the output sound, etc., can be adapted to the audience response by controlling the signal processing performed on the playback data.

The overall state of the audience can be easily and accurately detected by taking images of or collecting the sounds emitted by the entire audience.

The individual states of the members of the audience can also be easily and accurately detected by detecting the load applied to each seat and the stepping force provided by each member of the audience.

By using the recording medium in accordance with the present invention, it becomes possible to easily realize the audience response determination apparatus, playback output control system, audience response determination method and playback output control method according to the present invention in various types of halls.

What is claimed is:

1. An audience response determination apparatus for determining an audience response to displayed content, comprising:
   image input means for inputting image signals representing an image of members of said audience;
   motion vector determining means for receiving said image signal and determining motion vectors in said image;
   sound input means for inputting audio signals representing sounds generated by said members of such audience;
   audio determining means responsive to said audio signals to determine a sound state of said audience;
   individual state detection means for detecting individual load conditions of the members of the audience, including left and right stepping force detection means for detecting the stepping force of an individual member of the audience, thereby representing the individual response states of the members of the audience;
   auxiliary information means for supplying auxiliary information indicating whether the content currently is displayed and, if so, whether said content is video or audio content and, if video content, said auxiliary information is indicative of a scene in said video content;
   determination means for determining the audience response on the basis of said determined motion vectors, said determined sound state of said audience, the detected load conditions of said members, and said supplied auxiliary information, such that for given motion vectors, a given sound state and given load conditions, a different audience response is determined depending upon the auxiliary information; and
   wherein said determination means for determining the audience response comprises an audience state determination unit for estimating if a majority of said audience is intently watching or listening to said content, for estimating if a majority of said audience is clapping or singing along with the content, for estimating if a majority of said audience is clapping or shouting, for estimating if a majority of said audience is applauding or cheering and for estimating if a majority of said audience is standing, and for selecting the audience response as a function of said estimating.

2. An audience response determination apparatus according to claim 1, wherein said overall state detection means takes an image of the entire audience and detects the overall bodily state of the audience based on the image taken.

3. An audience response determination apparatus according to claim 1, wherein said overall state detection means collects sounds uttered by the entire audience and detects the overall state of the audience based on the sounds collected.

4. An audience response determination apparatus according to claim 1, wherein the load condition detected by said individual state detection means includes a load applied to each of the audience's seats.

5. An audience response determination apparatus according to claim 1, wherein said left and right stepping force detection means comprises:
   a left stepping force detector for detecting the stepping force provided by the left foot of each member of said audience; and
   a right stepping force detector for detecting the stepping force provided by the right foot of each member of said audience.

6. A playback output control system for controlling the output from playback means for the playback and output of data to be seen or heard by an audience, comprising:

image input means for inputting image signals representing an image of members of said audience;

motion vector determining means for receiving said image signal and determining motion vectors in said image;

sound input means for inputting audio signals representing sounds generated by said members of such audience;

audio determining means responsive to said audio signals to determine a sound state of said audience;

individual state detection means for detecting individual load conditions of the members of the audience, including left and right stepping force detection means for detecting the stepping force of an individual member of the audience, thereby representing individual response states of the members of said audience;

auxiliary information means for supplying auxiliary information indicating whether the content currently is displayed and, if so, whether said content is video or audio content and, if video content, said auxiliary information is indicative of a scene in said video content;

determination means for determining an audience response on the basis of said determined motion vectors, said determined sound state of said audience, the detected load conditions of said members, and said supplied auxiliary information, such that for given motion vectors, a given sound state and given load conditions, a different audience response is determined depending upon the auxiliary information;

wherein said determination means for determining an audience response comprises an audience state determination unit for estimating if a majority of said audience is intently watching or listening to said content, for estimating if a majority of said audience is clapping or singing along with the content, for estimating if a majority of said audience is clapping or shouting, for estimating if a majority of said audience is applauding or cheering and for estimating if a majority of said audience is standing, and for selecting the audience response as a function of said estimating; and control means for controlling the operation of said playback means based on the audience response selected by said determination means.

7. A playback output control system according to claim 6, wherein said control means selects, on the basis of said audience response determined by said determination means, data to be played back by said playback means.

8. A playback output control system according to claim 6, wherein said control means controls, on the basis of said audience response determined by said determination means, signal processing on the data played back by said playback means.

9. A playback output control system according to claim 6, wherein said overall state detection means takes an image of said audience and detects the overall bodily state of said audience based on the image.

10. A playback output control system according to claim 9, further comprising reduction means for reducing the effect of video data played back by and output from said playback means, wherein said overall state detection means detects the overall bodily state of said audience by reducing the effect of said video data on said image of said audience.

11. A playback output control system according to claim 6, wherein said overall state detection means detects the overall state of said audience by collecting sounds emitted by the audience.

12. A playback output control system according to claim 11, further comprising reduction means for reducing the effect of sound data played back and output by said playback means, wherein overall state detection means detects the overall state of the audience by reducing the effect of said sound data on the collected sounds emitted by said audience.

13. A playback output control system according to claim 11, wherein said overall state detection means detects the overall state of the audience by comparing the collected sounds with a reference sound level.

14. A playback output control system according to claim 13, further comprising varying means for varying said reference sound level on the basis of the audience size.

15. A playback output control system according to claim 11, further comprising a filter which passes a predetermined audio band, wherein said overall state determination means detects the overall state of the audience based on the sound passed through said filter.

16. A playback output control system according to claim 6, wherein the load condition detected by said individual state detection means includes a load applied to each of the audience's seats.

17. A playback output control system according to claim 6, wherein said left and right stepping force detection means comprises: a left stepping force detector for detecting the stepping force provided by the left foot of each member of the audience; and a right stepping force detector for detecting the stepping force provided by the right foot of each member of the audience.

18. An audience response determination method for determining an audience response to displayed content, comprising the steps of:

inputting image signals representing an image of members of said audience;

receiving said image signal and determining motion vectors in said image;

inputting audio signals representing sounds generated by said members of such audience;

determining a sound state of said audience in response to said inputted audio signals;

detecting individual load conditions of the members of the audience, including detecting a stepping force provided by a left foot of an individual member of the audience and detecting a stepping force provided by a right foot of the individual member, thereby representing individual response states of the members of said audience;

supplying auxiliary information indicating whether the content currently is displayed and, if so, whether said content is video or audio content and, if video content, said auxiliary information is indicative of a scene in said video content;

determining the audience response based on said determined motion vectors, said determined sound state of said audience, the detected load conditions of the members of said audience, and said supplied auxiliary information, such that for given motion vectors, a given sound state and given load conditions, a different audience response is determined depending upon the auxiliary information; and wherein the audience response is determined by estimating if a majority of said audience is intently watching or listening to said content, by estimating if a majority of said audience is clapping or singing along with the content, by estimating if a majority of said audience is clapping or shouting, by estimating if a majority of said audience is applauding or cheering and for estimating if a majority of said audience is standing, and by selecting the audience response as a function of said estimating.

19. A playback output control method for controlling a playback output, comprising the steps of:
inputting image signals representing an image of members of said audience;
receiving said image signal and determining motion vectors in said image;
inputting audio signals representing sounds generated by said members of such audience;
determining a sound state of said audience in response to said inputted audio signals;
detecting individual load conditions of members of the audience, including detecting a stepping force provided by a left foot of an individual member of the audience and detecting a stepping force provided by a right foot of the individual member, thereby representing individual response states of the members of said audience;
supplying auxiliary information indicating whether content currently is being played back and, if so, whether said content is video or audio content and, if video content, said auxiliary information is indicative of a scene in said video content;
determining an audience response based on said determined motion vectors, said determined sound state of said audience, the detected load conditions of the members of said audience, and said supplied auxiliary information, such that for given motion vectors, a given sound state and given load conditions, a different audience response is determined depending upon the auxiliary information;
wherein the audience response is determined by estimating if a majority of said audience response is intently watching or listening to said content, by estimating if a majority of said audience is clapping or singing along with the content, by estimating if a majority of said audience is clapping or shouting, by estimating if a majority of said audience is applauding or cheering and for estimating if a majority of said audience is standing, and by selecting the audience response as a function of said estimating, and
controlling the playback operation of data to be seen or heard by said audience based on the audience response that is selected.

20. A computer readable recording medium storing a processing program to control of processor to perform the method comprising the steps of:
inputting image signals representing an image of members of said audience;
receiving said image signal and determining motion vectors in said image;
inputting audio signals representing sounds generated by said members of such audience;
determining a sound state of said audience in response to said inputted audio signals;
detecting individual load conditions of the members of the audience, including detecting a stepping force provided by a left foot of an individual member of the audience and detecting a stepping force provided by a right foot of the individual member, thereby representing individual response states of the members of said audience;
supplying auxiliary information indicating whether content currently is being played back and, if so, whether said content is video or audio content and, if video content, said auxiliary information is indicative of a scene in said video content;
determining an audience response based on said determined motion vectors, said determined sound state of said audience, the detected load conditions of the members of said audience, and said supplied auxiliary information, such that for given motion vectors, a given sound state and given load conditions, a different audience response is determined depending upon the auxiliary information; and
wherein the audience response is determined by estimating if a majority of said audience is intently watching or listening to said content, by estimating if a majority of said audience is clapping or singing along with the content, by estimating if a majority of said audience is clapping or shouting, by estimating if a majority of said audience is applauding or cheering and for estimating if a majority of said audience is standing, and by selecting the audience response as a function of said estimating.

21. A computer readable recording medium storing a processing program to control of processor to perform the method comprising the steps of:
inputting image signals representing an image of members of said audience;
receiving said image signal and determining motion vectors in said image;
inputting audio signals representing sounds generated by said members of such audience;
determining a sound state of said audience in response to said inputted audio signals;
detecting individual load conditions of members of the audience, including detecting a stepping force provided by a left foot of an individual member of the audience and detecting a stepping force provided by a right foot of the individual member, thereby representing individual response states of the members of said audience;
supplying auxiliary information indicating whether content is currently played back and, if so, whether said content is video or audio content and, if video content, said auxiliary information is indicative of a scene in said video content;
determining an audience response based on said determined motion vectors, said determined sound state of said audience, the detected load conditions of the members of said audience, and said supplied auxiliary information, such that for given motion vectors, a given sound state and given load conditions, a different audience response is determined depending upon the auxiliary information;
wherein the audience response is determined by estimating if a majority of said audience response is intently watching or listening to said content, by estimating if a majority of said audience is clapping or singing along with the content, by estimating if a majority of said audience is clapping or shouting, by estimating if a majority of said audience is applauding or cheering and for estimating if a majority of said audience is standing, and by selecting the audience response as a function of said estimating, and
controlling a playback operation of data to be seen or heard by said audience based on the audience response that is selected.

22. An audience response determination apparatus for determining an audience response to displayed content, comprising:
image input means for inputting image signals representing an image of members of said audience;

motion vector determining means for receiving said image signal and determining motion vectors in said image;

sound input means for inputting audio signals representing sounds generated by said members of such audience;

audio determining means responsive to said audio signals to determine a sound state of said audience;

individual state detection means for detecting individual load conditions of the members of the audience, including a left stepping force detector for detecting a stepping force provided by a left foot of an individual member of the audience and a right stepping force detector for detecting a stepping force provided by a right foot of the individual member, thereby representing the individual states of the members of the audience;

auxiliary information means for supplying auxiliary information indicating the content currently displayed;

determination means for determining the audience response on the basis of said determined motion vectors, said determined sound state of said audience, the detected load conditions of said members, and said supplied auxiliary information, such that for given motion vectors, a given sound state and given load conditions, a different audience response is determined depending upon the auxiliary information; and wherein said determination means for determining the audience response comprises an audience state determination unit (i) for estimating whether most of the members of the audience are intently watching or listening to the content, (ii) for estimating whether most of the members of the audience are clapping their hands or singing along with the sound of the content, (iii) for estimating whether most of the members of the audience are clapping their hands or shouting, (iv) for estimating whether most of the members of the audience are applauding or cheering, (v) for estimating whether most of the members of the audience are standing and for selecting the audience response as a function of said estimating.

* * * * *